(12) United States Patent
Furuya

(10) Patent No.: US 6,904,866 B2
(45) Date of Patent: Jun. 14, 2005

(54) INDICATOR

(75) Inventor: Yoshiyuki Furuya, Shizuoka (JP)

(73) Assignee: Yazaki Corporation, Tokyo (JP)

(*) Notice: Subject to any disclaimer, the term of this patent is extended or adjusted under 35 U.S.C. 154(b) by 0 days.

(21) Appl. No.: 10/308,038

(22) Filed: Dec. 3, 2002

(65) Prior Publication Data

US 2003/0121467 A1 Jul. 3, 2003

(30) Foreign Application Priority Data

Dec. 27, 2001 (JP) .................................. 2001-397459

(51) Int. Cl.⁷ .................................................. G01D 11/28
(52) U.S. Cl. ............... 116/286; 116/62.1; 116/DIG. 36; 362/23; 340/815.78
(58) Field of Search ................................ 116/286, 287, 116/288, 62.1, 62.3, 62.4, 305, 304, 302, DIG. 36; 362/23, 28, 29, 359; 40/579, 580; 340/441, 815.53, 815.62, 815.78, 815.86

(56) References Cited

U.S. PATENT DOCUMENTS

| | | | | |
|---|---|---|---|---|
| 786,550 A | * | 4/1905 | Donnelly et al. .............. 40/579 |
| 2,173,316 A | * | 9/1939 | Orr ............................ 362/300 |
| 2,193,058 A | * | 3/1940 | Carver ......................... 40/579 |
| 2,328,485 A | * | 8/1943 | Ott ............................. 116/62.3 |
| 2,652,652 A | * | 9/1953 | Lasko .......................... 40/546 |
| 2,664,849 A | * | 1/1954 | Nallinger .................... 116/62.1 |
| 2,916,011 A | * | 12/1959 | Molis ......................... 116/288 |
| 4,215,647 A | * | 8/1980 | Fukasawa ................... 116/286 |
| 4,875,433 A | * | 10/1989 | Tsukamoto ................. 116/335 |
| 4,878,453 A | * | 11/1989 | Inoue et al. ................ 116/288 |
| 4,891,896 A | * | 1/1990 | Boren .......................... 40/541 |
| 4,976,057 A | * | 12/1990 | Bianchi ....................... 40/579 |
| 5,129,269 A | * | 7/1992 | Iizuka et al. ............... 73/866.3 |
| 5,142,274 A | * | 8/1992 | Murphy et al. ................ 345/7 |
| 5,284,108 A | * | 2/1994 | Furuya ....................... 116/286 |
| 5,353,735 A | * | 10/1994 | Arai et al. .................. 116/286 |
| 5,513,153 A | * | 4/1996 | Thorgersen et al. ........ 368/227 |
| 5,604,480 A | * | 2/1997 | Lamparter .................. 362/478 |
| 5,687,500 A | * | 11/1997 | Lamparter .................... 40/572 |
| 6,070,549 A | * | 6/2000 | Iuchi et al. ................. 116/287 |
| 6,205,691 B1 | * | 3/2001 | Urda et al. ................... 40/559 |
| 6,208,591 B1 | * | 3/2001 | Sakurazawa et al. ......... 368/67 |
| 6,240,664 B1 | * | 6/2001 | Hjaltason ..................... 40/546 |
| 6,663,252 B1 | * | 12/2003 | Fong et al. ................... 362/29 |
| 6,682,201 B2 | * | 1/2004 | Kneer et al. ................. 362/26 |
| 2002/0189526 A1 | * | 12/2002 | Sugimoto .................... 116/286 |
| 2003/0123259 A1 | * | 7/2003 | Furuya et al. .............. 362/489 |
| 2003/0189819 A1 | * | 10/2003 | Furuya ........................ 362/26 |

FOREIGN PATENT DOCUMENTS

| | | | |
|---|---|---|---|
| DE | 35 00 899 A | 7/1986 | |
| GB | 2173630 A | * 10/1986 | ........... G09F/13/06 |
| GB | 2 235 295 A | 2/1991 | |
| JP | 61-71319 | 4/1986 | |
| JP | 11-176226 | 7/1999 | |
| JP | 2000-159010 | 6/2000 | |

OTHER PUBLICATIONS

British Search Report dated May 21, 2003.

* cited by examiner

*Primary Examiner*—Christopher W. Fulton
*Assistant Examiner*—Amy R. Cohen
(74) *Attorney, Agent, or Firm*—Armstrong, Kratz, Quintos, Hanson & Brooks, LLP.

(57) ABSTRACT

An indicator having a character plate capable of making indicative characters emit light is provided, wherein a metal character plate 30 is provided with cut-out portions 30a being cut out along the peripheries of respective indicative characters, a back light source emits light on the back of the metal character plate 30, and a light-transmissive plate 40 are provided with projecting portions 40a to fit in cutout portions 30a of the metal character plate 30.

14 Claims, 6 Drawing Sheets

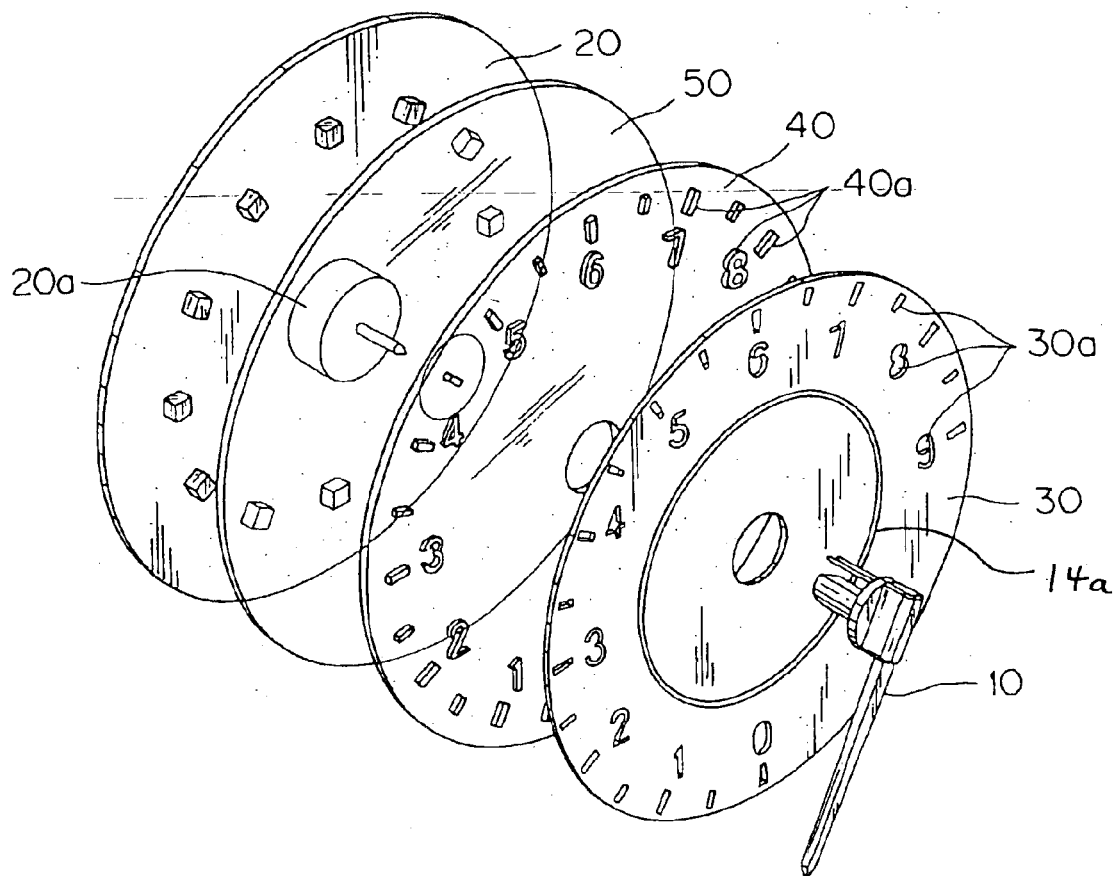
FIG. 1
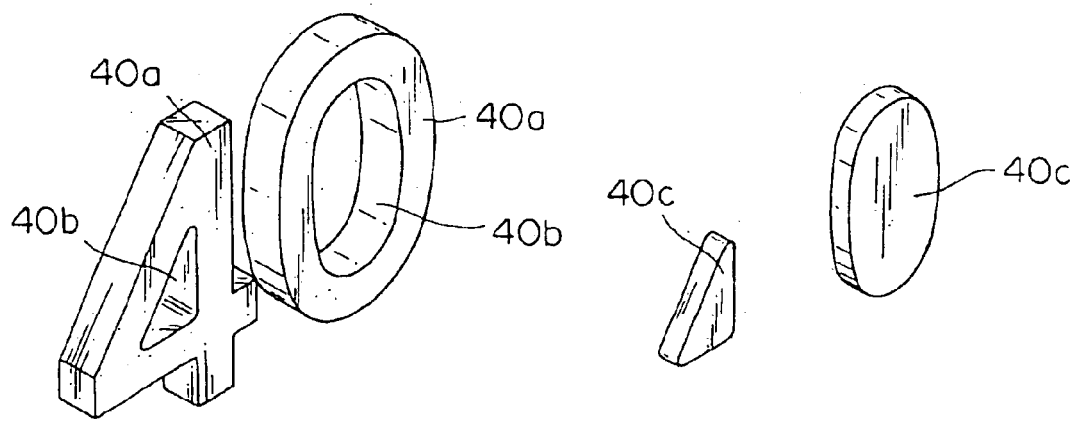
FIG. 4a  FIG. 4b

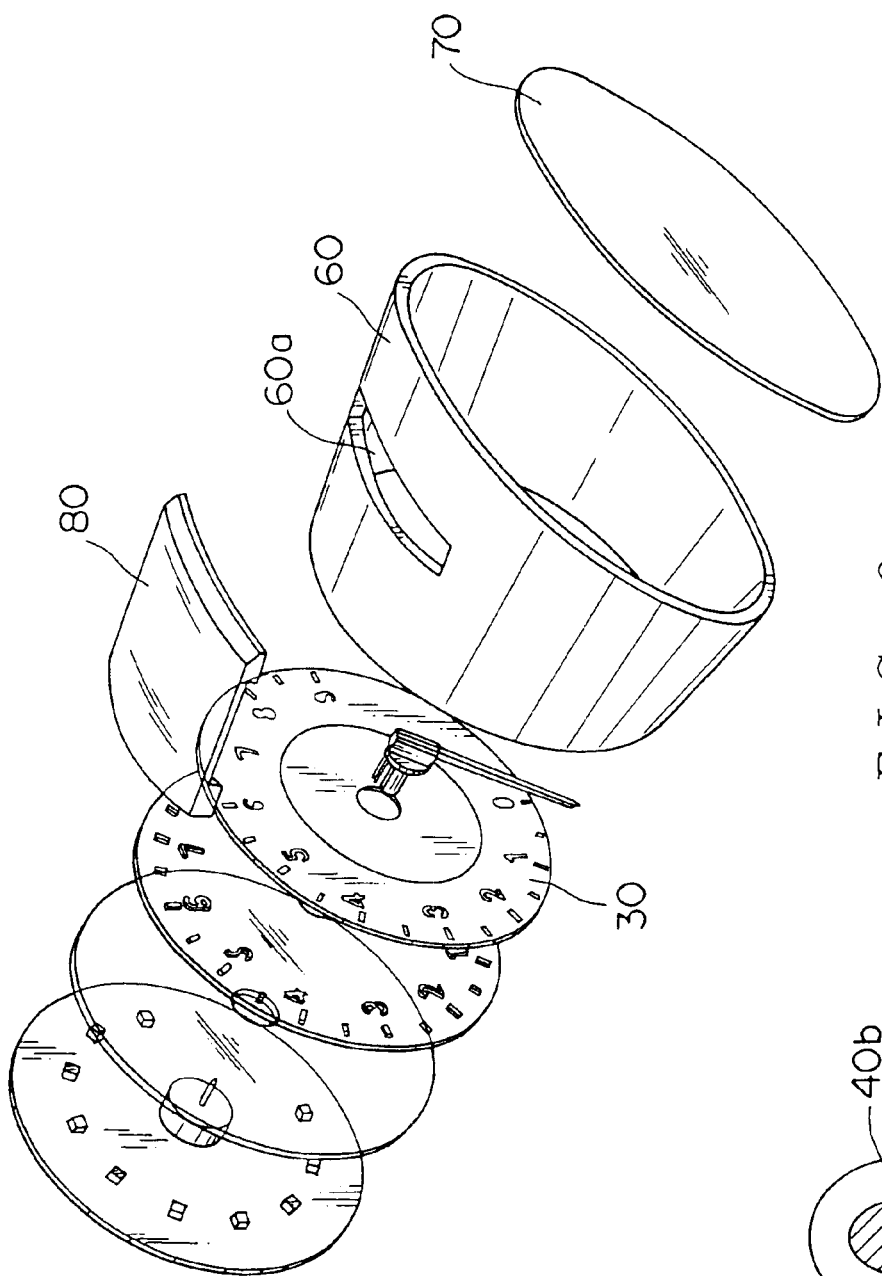
FIG. 2
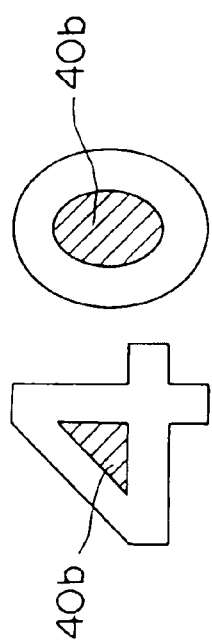
FIG. 3

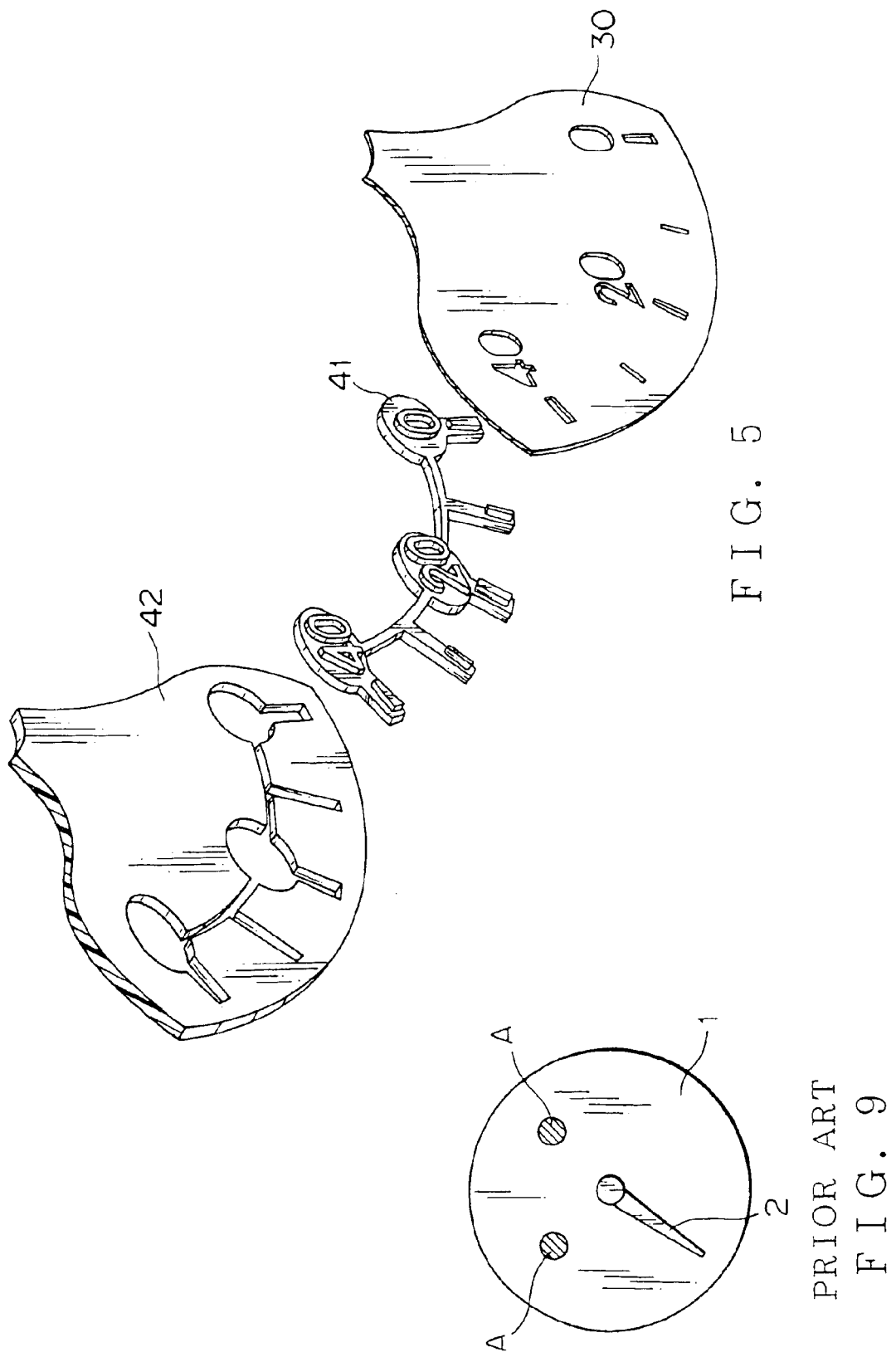
FIG. 5
PRIOR ART
FIG. 9

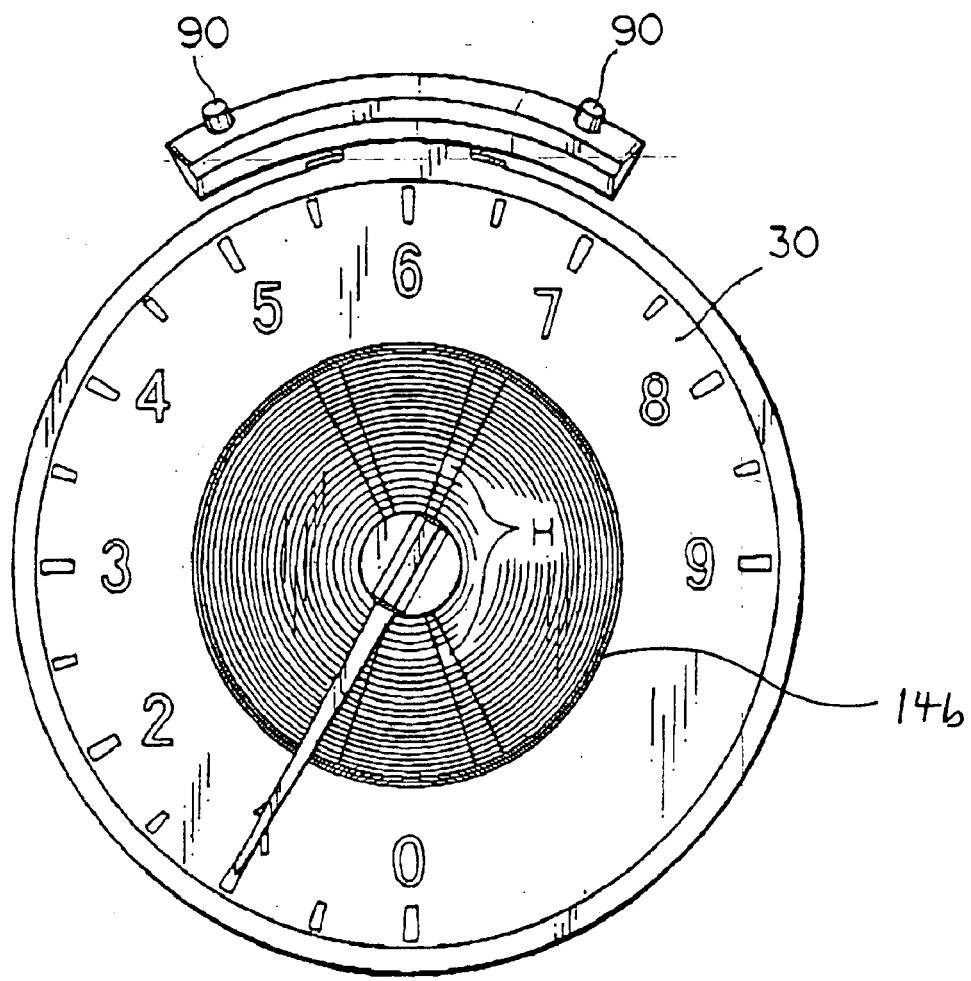
FIG. 6A
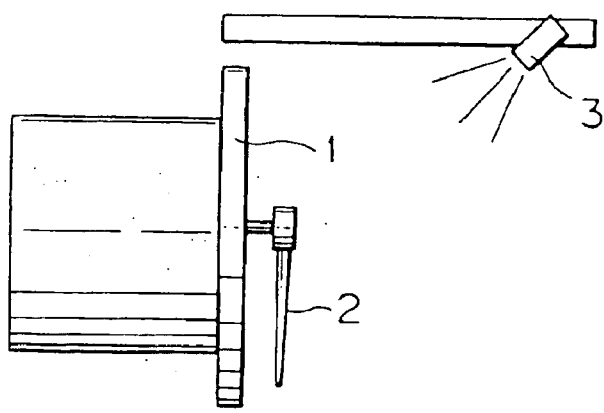
PRIOR ART
FIG. 8

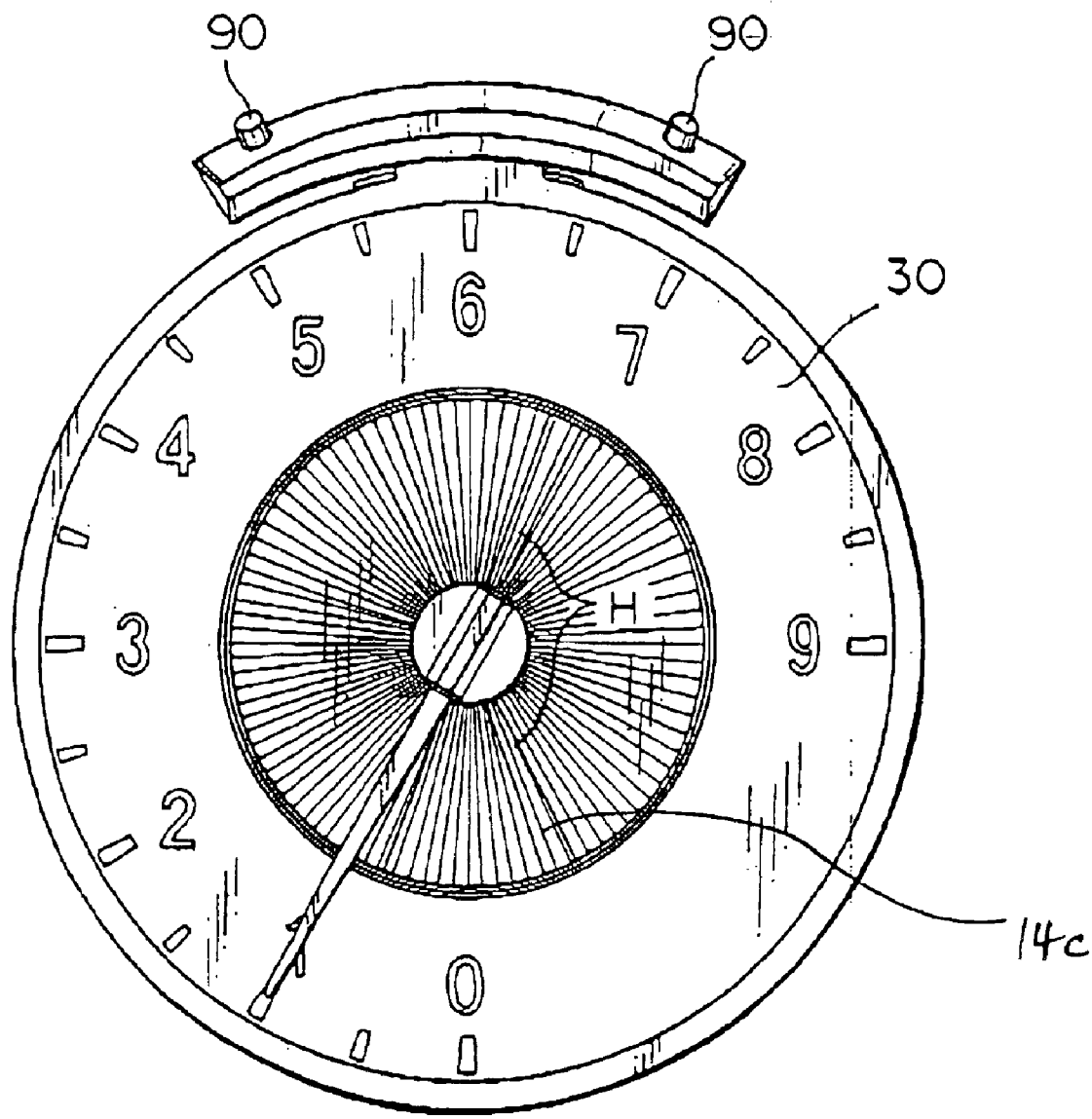
FIG. 6 B

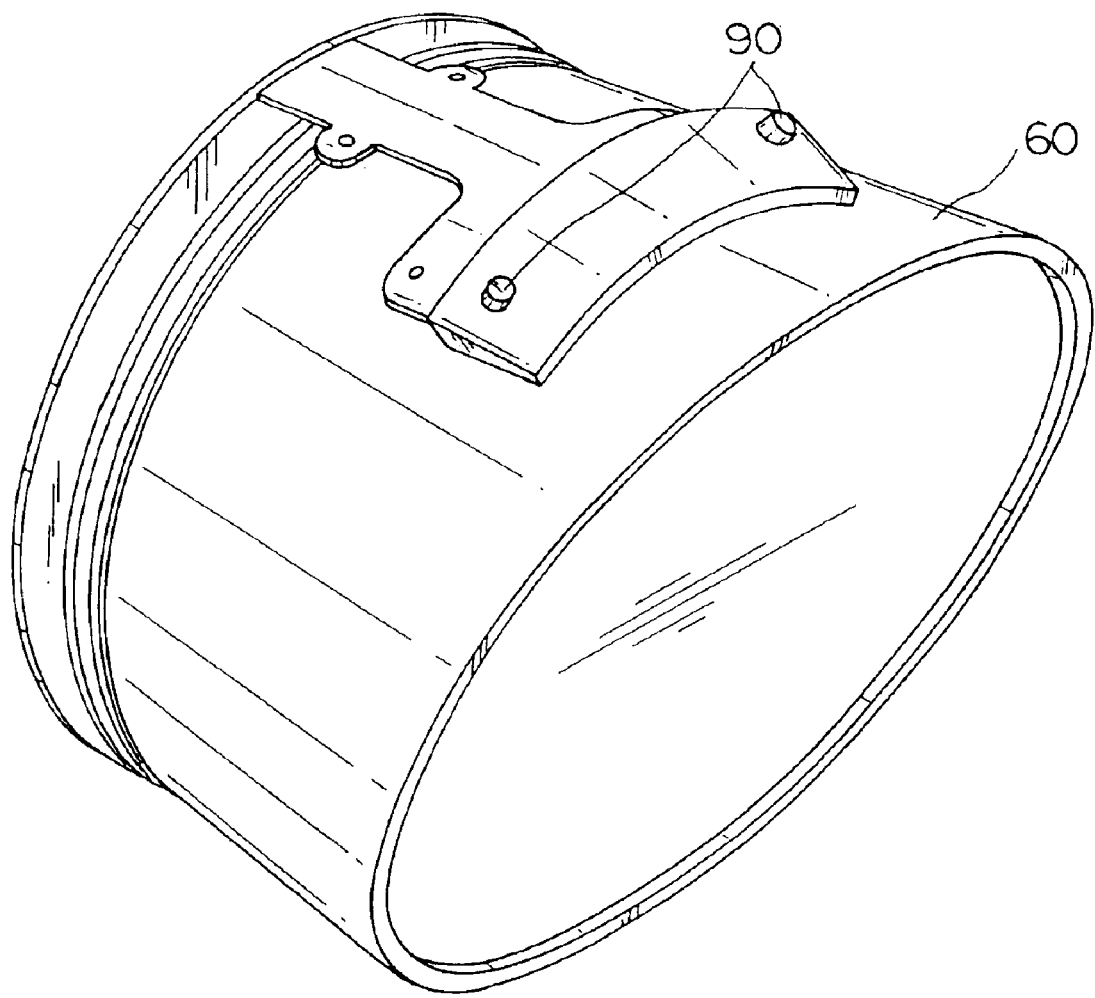
FIG. 7

INDICATOR

BACKGROUND OF THE INVENTION

1. Field of the Invention

This invention relates generally to an indicator, and more particularly, to an indicator carried on a vehicle.

2. Description of the Related Art

Pointer-type indicating devices for indicating measured values such as the vehicle speed and the engine rotation speed are generally carried on a vehicle. These indicating devices each has a character plate provided with indicative characters such as scales, numerals, letters or symbols, a pointer arranged on the character plate, an inner mechanism to drive the pointer according to a measured amount, and a wiring board on which a circuit pattern is provided and to which the inner mechanism is fixed.

The above character plate is formed of a light-transmissive plate made of acrylic resin or polycarbonate resin, and, for example, a printing in dark color is carried out on the face of the light-transmissive plate except the indicative characters. The pointer and the character plate are visible in the day light, and, in the night, the indicative characters are visible by making the indicative characters luminous by passing the light therethrough, which light is from a light source positioned behind the character plate.

There is a demand that the character plate be made of metal in order to give the indicating device a high-grade feeling. However, it would be difficult to print metal on the surface of the light-transmissive plate, and the indicative characters on a metal character plate have not been luminous.

Indicative characters printed on a metal character plate 1 and also a pointer 2 might be lighted up by diodes 3 as shown in FIG. 8. However, in this case, the light is not uniformly irradiated to the whole character plate 1, and high luminance portions A would arise as shown in FIG. 9.

SUMMARY OF THE INVENTION

In view of the foregoing, an object of the present invention is to provide an indicator having a character plate capable of making indicative characters emit light.

In order to achieve the above object, as a first aspect of the present invention, an indicator comprises: a metal character plate provided with cut-out portions being cut out along peripheries of respective indicative characters to indicate a measured value; and a back light source to emit light on a back of the metal character plate.

As a second aspect of the present invention, based on the first aspect, the indicator further comprises: a front light source to emit light on a face of the metal character plate.

As a third aspect of the present invention, based on the second aspect, the front light source illuminates the metal character plate in such a way that a straight high luminance portion arises on the metal character plate.

As a fourth aspect of the present invention, based on the second aspect, the front light source illuminates the metal character plate in such a way that straight high luminance portions crossing each other arise on the metal character plate.

As a fifth aspect of the present invention, based on the third aspect, a pattern of concentric circles is formed on a face of the metal character plate.

As a sixth aspect of the present invention, based on the third aspect, a pattern of radial lines is formed on a face of the metal character plate.

As a seventh aspect of the present invention, based on any one of the first to sixth aspects, the back light source has a light-emitting element to emit light entering a light-transmissive plate provided at a back of the metal character plate.

As an eighth aspect of the present invention, based on the seventh aspect, the light-transmissive plate is provided with projecting portions to fit in the cut-out portions of the metal character plate.

As a ninth aspect of the present invention, based on the eighth aspect, the projecting portions are divided into at least two groups formed on respective divided light-transmissive plates.

As a tenth aspect of the present invention, based on the seventh aspect, when the indicative character has a hole surrounded with a straight or curved line forming the indicative character, a portion corresponding to the hole of the light-transmissive plate is printed in a color same as that of the metal character plate.

As an eleventh aspect of the present invention, based on the seventh aspect, when the indicative character has a hole surrounded with a straight or curved line forming the indicative character, a portion corresponding to the hole of the light-transmissive plate sinks from a front face of the indicative character.

As a twelfth aspect of the present invention, based on the eleventh aspect, a hole-filling piece having a face printed in a color same as that of the metal character plate is fitted in the hole.

As a thirteenth aspect of the present invention, based on any one of the eighth to eleventh aspects, the light-transmissive plate is formed in a state that the metal character plate is insert-molded in the light-transmissive plate.

According to the above-described structures of the present invention, the following advantages are provided.

(1) According to the first aspect of the invention, the metal character plate is provided with cut-out portions being cut out along peripheries of respective indicative characters to indicate a measured value. The back light source emits light on a back of the metal character plate. Accordingly, the light from the back light passes through the cut-out portions provided on the metal character plate to a driver's eye point, thereby making the driver look at the indicative characters in such a way that the indicative characters are emitting light. Therefore, the indicator which can make the indicative characters emit light by even using the metal character plate can be obtained.

(2) According to the second aspect of the invention, the front light source illuminates the face of the metal character plate. Therefore, the face of the metal character plate can be looked at even in the night, thereby improving the designing of the indicator.

(3) According to the third aspect of the invention, the front light source illuminates the metal character plate in such a way that the straight high luminance portion arises on the metal character plate. Accordingly, the high luminance portion makes the metal character plate look like just metal, thereby improving the designing of the indicator.

(4) According to the fourth aspect of the invention, the front light source illuminates the metal character plate in such a way that straight high luminance portions crossing each other arise on the metal character plate. Accordingly, the high luminance portions make the metal character plate further look like just metal, thereby improving the designing of the indicator.

(5) According to the fifth and sixth aspects of the invention, a pattern of concentric circles or radial lines is formed on a face of the metal character plate. Accordingly, the straight high luminance portion is visible even in the day light. Therefore, the metal character plate 30 can be similarly seen night and day.

(6) According to the seventh aspect of the invention, the light emitted from the light-emitting element passes through the cut-out portions through the light-transmissive plate. Accordingly, the light from the light-emitting element is dispersed by the light-transmissive plate so that the light can pass through all the cut-out portions uniformly, thereby improving the designing of the indicator.

(7) According to the eighth aspect of the invention, the projecting portions provided on the light-transmissive plate fit in the cut-out portions of the metal character plate. Accordingly, even if the metal character plate 30 is fairly thick, the cut-out portions 30*a* do not look like dented, thereby improving the designing of the indicator.

(8) According to the ninth aspect of the invention, the projecting portions are divided into at least two groups formed on respective divided light-transmissive plates. This enables the grouped projecting portions 40*a* to securely match the corresponding cut-out portions 30*a*, thereby improving the designing of the indicator.

(9) According to the tenth and eleventh aspects of the invention, in addition to the periphery of the indicative character, the hole can be more clearly recognized, thereby improving the designing of the indicator.

(10) According to the twelfth aspect of the invention, a hole-filling piece having a face printed in a color same as that of the metal character plate is fitted in the hole. Accordingly, in addition to the periphery of the indicative character, the hole can be more clearly recognized, thereby improving the designing of the indicator.

(11) According to the thirteenth aspect of the invention, the light-transmissive plate is formed in a state that the metal character plate is insert-molded in the light-transmissive plate. Accordingly, the projecting portions 40*a* are easily accurately placed in the respective cut-out portions 30*a*, thereby improving the designing of the indicator.

The above and other objects and features of the present invention will become more apparent from the following description taken in conjunction with the accompanying drawings.

BRIEF DESCRIPTION OF THE DRAWINGS

FIG. 1 is an exploded perspective view showing an embodiment of a vehicle-use indicating device with the inventive indicator.

FIG. 2 is an exploded perspective view showing an embodiment of the vehicle-use indicating device with the inventive indicator.

FIG. 3 is a schematic diagram showing a hole 40*b*.

FIG. 4*a* is a partly enlarged perspective view showing "40" of a light-transmissive plate 40.

FIG. 4*b* is an enlarged perspective view of hole-filling pieces 40*c*.

FIG. 5 is a partly enlarged perspective view of a divided light-transmissive plate 40.

FIG. 6A is a partial front view of an indicating device having a light-emitting element 90.

FIG. 6B is a partial front view of an indicating device having a light-emitting element 90.

FIG. 8 is a side view showing a prior art indicator.

FIG. 9 is a front view of a prior art character plate on which high luminance portions are arising.

DESCRIPTION OF THE PREFERRED EMBODIMENT(S)

Embodiment(s) of the present invention will now be described in further detail with reference to the accompanying drawings. FIG. 1 or FIG. 2 is an exploded perspective view showing an embodiment of a vehicle-use indicating device with the inventive indicator. As shown in FIG. 1, the vehicle-use indicating device has a pointer 10 to point at a measured value, a baseplate 20 to which a movement 20*a* to rotate the pointer 10 is electrically connected, and a metal character plate 30 having cut-out portions 30*a* each being cut out along the periphery of each indicative character.

The vehicle-use indicating device also has a light-transmissive plate 40, arranged behind the metal character plate 30 and having projecting portions 40*a* fitted in the respective cut-out portions 30*a*, and a light-dispersion plate 50 arranged behind the light-transmissive plate 40. The above light-transmissive plate 40 and the light-dispersion plate 50 are made of acrylic resin or polycarbonate resin.

The vehicle-use indicating device further has an inside cover 60 covering the above plates 30,40,50, and so on as shown in FIG. 2, a face glass 70 closing an opening portion of the inside cover 60 and preventing the dust from entering, and a light-leading prism 80 whose one portion is fitted in an opening 60*a* provided on an upper surface of the inside cover 60.

As shown in FIG. 3, the indicative character, for example, "0" or "4" has a hole 40*b* surrounded with a straight or curved line forming the indicative character. As shown in FIG. 4*a*, the indicative character "0" or "4" has a projecting portion 40*a* and a hole 40*b* which sinks from the face of the indicative character.

According to the vehicle-use indicating device of the above structure, when a non-shown light source provided at back of the light-dispersion plate 50 emits light, the light is dispersed by the light-dispersion plate 50 and enters the light-transmissive plate 40. The light entered the light-transmissive plate 40 passes through the cut-out portions 30*a* of the metal character plate 30 and reaches a driver's eye point. Therefore, the cut-out portions 30*a* of the metal character plate 30 seem luminous.

The light from the non-shown light source further enters the light-leading prism 80 and illuminates a front face of the metal character plate 30 from an opening 60*a* of the inside cover 60 so that the metal character plate 30 can be looked at in the dark.

As above, the light-transmissive plate 40 is provided with the projecting portions 40*a* to fit in the cut-out portions 30*a* of the metal character plate 30. Therefore, even if the metal character plate 30 is fairly thick, the cut-out portions 30*a* do not look like dented, thereby improving the designing. The holes 40*b*, which have been dented, can be fairly clearly recognized.

For improving the clarity of each hole 40*b*, a hole-filling piece 40*c* may be fitted in each hole 40*b* as shown in FIG. 4*b*. The face of the hole-filling piece 40*c* is printed in the same color as the metal character plate 30. Otherwise, the bottom of the hole 40*b* of the light-transmissive plate 40 may be printed in the same color as the metal character plate 30.

As above, the light passing through the hole 40*b* is intercepted by the hole-filling piece 40*c* or the above printing on the bottom of the hole 40*b*, the hole 40*b* can be more clearly recognized.

Here, in the indicating device with the above structure, all the projecting portions 40*a* formed on a single light-transmissive plate 40 shown in FIG. 1 have to fit in the respective cut-out portions 30a, which would not necessarily be easy.

In order to solve such a problem, as shown in FIG. 5, the projecting portions 40a are divided into at least two groups on respective light-transmissive pieces 41. This enables the grouped projecting portions 40a to match the corresponding cutout portions 30a. Here, reference numeral 42 denotes a member to fix the light-transmissive piece 41.

Otherwise, for example, if the metal character plate 30 is insert-molded in the light-transmissive plate 40, the projecting portions 40a are easily accurately placed in the respective cut-out portions 30a.

Here, in the above embodiment with the light-leading prism 80, the whole metal character plate 30 is illuminated with the light-leading prism 80. However, as shown in FIGS. 6A, 6B, or 7 for example, light-emitting elements 90 may be provided in such a way that high luminance portions H, being straight and crossing each other, can be formed on the surface of the metal character plate table 30. The high luminance portions H make the metal character plate 30 look like just metal.

In the embodiment with the high luminance portions H, a pattern of projecting concentric circles 14a, 14b or projecting radial lines 14c may be formed on the face of the metal character plate 30. When the face of the metal character plate 30 with the above pattern is illuminated with the day light, high luminance portions, being straight and crossing each other, could be formed on the surface of the metal character plate table 30. Therefore, the metal character plate 30 can be similarly seen night and day.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. An indicator comprising:
   a metal character plate provided with cut-out portions being cut out along peripheries of respective indicative characters to indicate a measured value;
   a back light source to emit light on a back of the metal character plate;
   a light-transmissive plate provided with projecting portions corresponding to the indicative characters, wherein the light-transmissive plate is behind the metal plate; and
   a pointer rotating to point to the characters corresponding to the measured value.

2. The indicator as set forth in claim 1, further comprising:
   a front light source to emit light on a face of the metal character plate.

3. The indicator as set forth in claim 2, wherein
   the front light source illuminates the metal character plate in such a way that a straight high luminance portion arises on the metal character plate.

4. The indicator as set forth in claim 2, wherein
   the front light source illuminates the metal character plate in such a way that straight high luminance portions crossing each other arise on the metal character plate.

5. The indicator as set forth in claim 3, wherein
   a pattern of concentric circles is formed on a face of the metal character plate.

6. The indicator as set forth in claim 3, wherein
   a pattern of radial lines is formed on a face of the metal character plate.

7. The indicator as set forth in any one of claims 1–6, wherein
   the back light source has a light-emitting element to emit light entering the light-transmissive plate.

8. The indicator as set forth in claim 7, wherein
   the projecting portions being formed to fit in the cut-out portions of the metal character plate.

9. The indicator as set forth in claim 8, wherein
   the projecting portions are divided into at least two groups formed on respective divided light-transmissive plates.

10. The indicator as set forth in claim 7, wherein
    when the indicative character has a hole surrounded with a straight or curved line forming the indicative character, a portion corresponding to the hole of the light-transmissive plate is printed in a color same as that of the metal character plate.

11. The indicator as set forth in claim 7, wherein
    when the indicative character has a hole surrounded with a straight or curved line forming the indicative character, a portion corresponding to the hole of the light-transmissive plate sinks from a front face of the indicative character.

12. The indicator as set forth in claim 11, wherein
    a hole-filling piece having a face printed in a color same as that of the metal character plate is fitted in the hole.

13. The indicator as set forth in claim 8, wherein the light-transmissive plate is formed in a state that the metal character plate is insert-molded in the light-transmissive plate.

14. The indicator as set forth in claim 10, wherein the light-transmissive plate is formed in a state that the metal character plate is insert-molded in the light-transmissive plate.

* * * * *